United States Patent
Matsumoto

(10) Patent No.: US 6,683,661 B2
(45) Date of Patent: Jan. 27, 2004

(54) LIQUID CRYSTAL DISPLAY AND IMAGE DISPLAY DEVICE USING THE SAME

(75) Inventor: Seiichi Matsumoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 342 days.

(21) Appl. No.: 09/924,059

(22) Filed: Aug. 8, 2001

(65) Prior Publication Data
US 2002/0021398 A1 Feb. 21, 2002

(30) Foreign Application Priority Data
Aug. 9, 2000 (JP) .......................... 2000-241714

(51) Int. Cl.[7] .................. G02F 1/136; G02F 1/1343; G02F 1/1339
(52) U.S. Cl. .................. 349/43; 349/149; 349/139; 349/157
(58) Field of Search .................. 349/43, 149, 139, 349/151

(56) References Cited

U.S. PATENT DOCUMENTS 6,069,678 A * 5/2000 Sakamoto et al. .......... 349/141
6,608,613 B2 * 8/2003 Koyama et al. .............. 349/98

FOREIGN PATENT DOCUMENTS

JP 2001-125122 5/2001

* cited by examiner

Primary Examiner—Eddie Lee
Assistant Examiner—Joseph Nguyen
(74) Attorney, Agent, or Firm—McGinn & Gibb, PLLC

(57) ABSTRACT

A liquid crystal display (LCD) is provided which is capable of reducing wiring resistance at a routing section of a common wiring and changes in a common voltage to be applied to the common wiring, thus achieving a reduction in "color degradation" and "horizontal stroke" in the LCD and of reducing "luminance irregularity". The liquid crystal display (LCD) has a first routing section made up of a metal film having very low transmittance of light emitted from a backlight and formed in a manner that a gap between blocks being adjacent along one side of a display area is almost filled in and a second routing section made up of the above metal film and formed in a manner that a region surrounded by an outer side portion of a block mounted outside the display area and by straight lines being four sides of the display area which have extended toward end portions of a glass substrate is almost filled in.

10 Claims, 8 Drawing Sheets

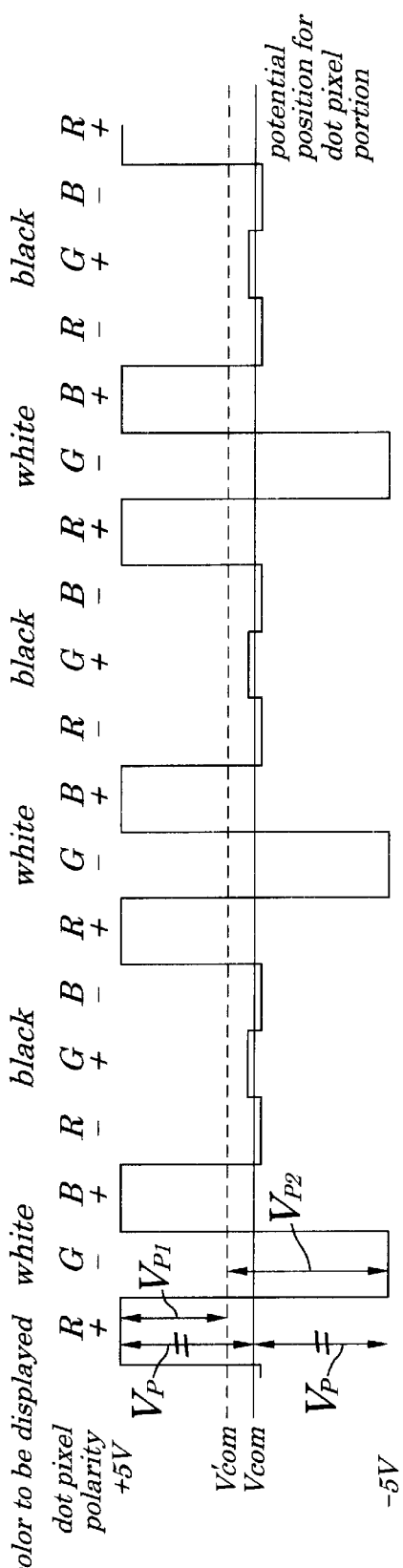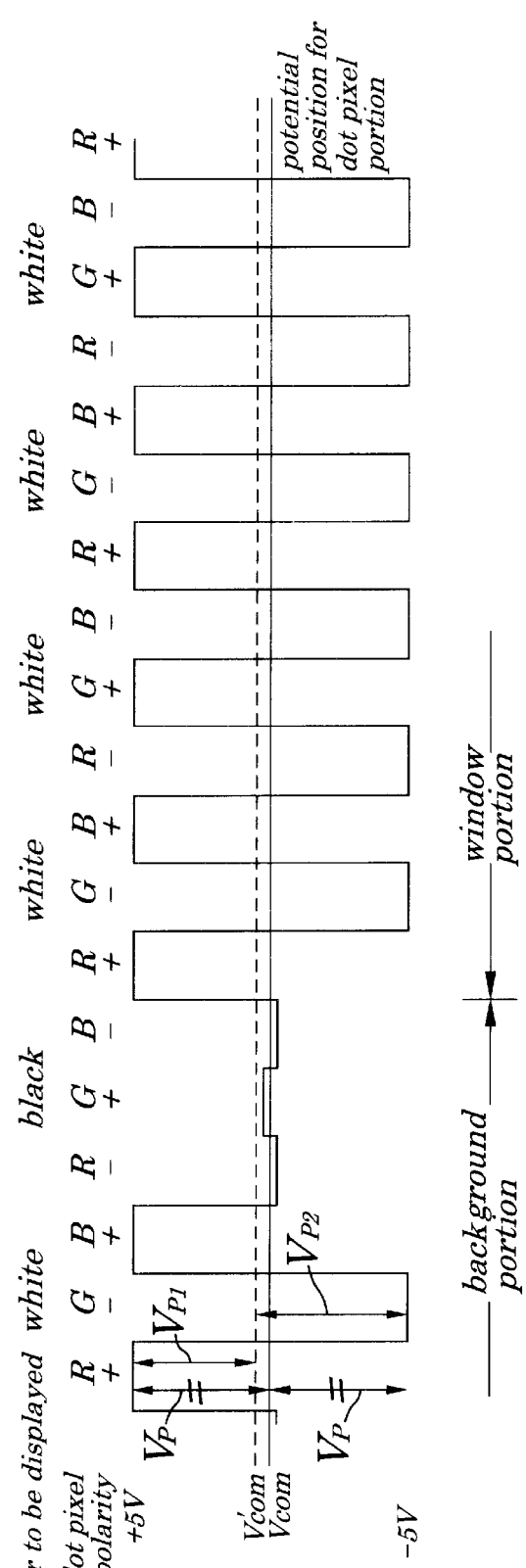

US 6,683,661 B2

LIQUID CRYSTAL DISPLAY AND IMAGE DISPLAY DEVICE USING THE SAME

BACKGROUND OF THE INVENTION

1. Field of the Invention

The present invention relates to a liquid crystal display (hereinafter referred simply as an LCD) and an image display device, and more particularly to the LCD used as a monitor or a like of a computer and provided with liquid crystal cells arranged in a matrix form and the image display device equipped with the above LCD.

The present application claims priority of Japanese Patent Application No. 2000-241714 filed on Aug. 9, 2000, which is hereby incorporated by reference.

2. Description of the Related Art

FIG. 10 is a top view of an example of configurations of a conventional LCD constructed of a transverse electric field-type liquid crystal which has been disclosed in Japanese Laid-open Patent Application No. 2001-125122. Here, the transverse electric field-type liquid crystal refers to a liquid crystal in which an electric field is formed in a transverse direction (that is, in a direction parallel to an upper face on an glass substrate 1 being approximately quadrangular on which the LCD is formed) in a liquid crystal cell. The transverse electric field-type liquid crystal has a characteristic of having a small dependency on a viewing angle in contrast and therefore it is increasingly used in recent years.

The disclosed LCD is an active-matrix LCD using a TFT (Thin Film Transistor) as a switching element and, as shown in FIG. 11, includes a dot pixel portion 4 surrounded by a plurality of scanning lines 2 disposed at specified intervals in a column direction (that is, in a longitudinal direction) and a plurality of signal lines 3 disposed at specified intervals in a row direction (that is, in a transverse direction), a liquid crystal cell 5 mounted on each of the dot pixel portion 4 having a liquid crystal layer serving equivalently as a capacitive load, a pixel electrode 6 and a common electrode 8 formed opposite to each other in a manner that a liquid crystal layer is put between the pixel electrode 6 and the common electrode 8 and a TFT 7 whose source is connected to one end of the pixel electrode 6. The LCD in this example displays characters, images, or a like, while a common voltage $V_{com}$ is applied to the common electrode 8 through a common signal line 9 in each row and in each column, when a data signal produced based on a video signal is applied to the signal line 3 and when a scanning signal produced based on a horizontal sync signal and a vertical sync signal is applied to the scanning line 2. Each of the common signal lines 9 is connected to a common wiring 10 which is mounted in a shape of an approximate character "⊐" (or the approximate character "▫") (see FIG. 10) in a manner that it surrounds a display area 11 where the dot pixel portion 4 are arranged in a matrix form.

Moreover, though not shown in FIG. 11, more exactly, it can be considered as if an equivalent capacitors were to be formed by the liquid crystal layer serving as a dielectric in the liquid crystal cell 5 and by the pixel electrode 6 and the common electrode 8 sandwiching the liquid crystal layer in a manner to be opposite to each other and that other capacitors are further connected in parallel to the liquid crystal layer of the liquid crystal cell 5. These other capacitors are called a common storage in a sense that they are formed relative to the common electrode 8 and called an auxiliary capacitor in a sense that it helps the liquid crystal layer in the liquid crystal cell 5 to accumulate a signal charge for one vertical sync period of time.

In the LCD shown in FIG. 10, all the signal lines 3 are routed to an upper portion on an upper side of the display area 11 and divided into three blocks $12_1$ to $12_3$ and a plurality of signal lines 3 making up each of the blocks $12_1$ to $12_3$ is gathered in a manner to form an approximately trapezoidal shape and an end of each of the signal lines 3 is connected to each of corresponding signal terminals arranged at a predetermined pitch. Similarly, all the scanning lines 2 are routed both to a right portion on a right side of the display area 11 and to a left portion on a left side of the display area 11 and divided into three blocks $13_1$ to $13_3$ and $14_1$ to $14_3$ and a plurality of scanning lines 2 making up each of the blocks $13_1$ to $13_3$ and of the blocks $14_1$ to $14_3$ is gathered in a manner to form an approximately trapezoidal shape and an end of each of the scanning lines 2 is connected to each of corresponding scanning terminals arranged at a predetermined pitch. A pair of the scanning terminals disposed in a position symmetrical right and left is connected to each other through the same scanning line 2.

The common wiring 10, as shown in FIG. 10, is mounted in a portion adjacent to the display area 11 in a shape of the approximate character "⊐" (or the approximate character "▫"). The common wiring 10 is routed to an upper portion of the glass substrate 1 along both ends of each of the blocks $12_1$ to $12_3$ in the upper portion on the upper side of the display area 11 to form routing sections $10_{a1}$ to $10_{a6}$. The common wiring 10 is routed to a leftmost portion of the glass substrate 1 along both ends of each of the blocks $13_1$ to $13_3$ in the left portion on the left side of the display area 11 to form the routing sections $10_{b1}$ to $10_{b6}$. The common wiring 10 is routed to a rightmost portion of the glass substrate 1 along both ends of each of the blocks $14_1$ to $14_3$ in the right portion on the right side of the display area 11 to form the routing sections $10_{c1}$ to $10_{c6}$. An end of each of the routing sections $10_{a1}$ to $10_{a6}$, $10_{b1}$ to $10_{b6}$, and $10_{c1}$ to $10_{c6}$ is connected to each of corresponding common terminals $15_1$ to $15_6$, $16_1$ to $16_6$, and $17_1$ to $17_6$ respectively.

The aim of dividing the scanning lines 2 and signal lines 3 into blocks $12_1$ to $12_3$, $13_1$ to $13_3$, and $14_1$ to $14_3$ each having specified numbers of lines and of forming each of the routing sections $10_{a1}$ to $10_{a6}$, $10_{b1}$ to $10_{b6}$, and $10_{c1}$ to $10_{c6}$ of the common wiring 10 along both ends of corresponding blocks $12_1$ to $12_3$, $13_1$ to $13_3$, and $14_1$ to $14_3$ and of routing the scanning lines 2 and signal lines 3 to form the approximately trapezoidal shape so that each of the end portions is connected to each of the scanning terminal and of the signal terminals and each of common terminals being mounted to be placed at the specified pitch, is to place each of terminals and end portions fixedly in a specified position. Also, the aim of placing each of terminals and end portions fixedly in the specified position is to enable a package being one of a TCP (Tape Carrier Package) mounted by using TAB (Tape Automated Bonding) technology and being used in a driving circuit to drive the LCD to be commonly used in different kinds of the LCDS. The LCD, while the TCP is connected, by using a thermo compression bonding method, to the scanning terminals and signal terminals connected to the blocked scanning lines 2 and signal lines 3 and common terminals $15_1$ to $15_6$, $16_1$ to $16_6$, and $17_1$ to $17_6$ connected to the common wiring 10, is connected to a driving circuit mounted on the TCP or a printed board through the TCP. That is, by arranging each of the terminals and end portions at the specified pitch being common to various types of the LCD, each of terminals of the TCP to be connected to these terminals can be placed in a specified position accordingly and a package for the driving circuit being the TCP can be used commonly in different kinds of the LCDs.

By configuring above, since common terminals $15_1$ to $15_6$, $16_1$ to $16_6$, and $17_1$ to $17_6$ for every block made up of the scanning lines 2 and signal lines 3 are provided, wiring resistance of the common wiring 10 can be dispersed more and can be reduced more, as a whole, compared with a case in which the common terminal are mounted simply on both ends in the upper portion on the upper side, in the right portion on the right side and in the left portion on the left side of the display area 11 (that is, a case in which, in FIG. 10, only the common terminals $15_1$, $15_6$, $16_1$, $16_6$, $17_1$, and $17_6$ were to be provided), as a result, crosstalk and/or dispersion in luminance among the dot pixel portions 4 can be reduced.

However, when the above conventional LCD is used as a monitor for a computer or a like, it presents the following problems.

Let it be assumed that an image as shown in FIG. 12 is displayed on a color LCD called an SXGA (Super Extended Graphics Array) which can provide a resolution of 1280 pixels×1024 pixels. In this color LCD, color filters are arranged in a stripe manner in which color filters for three primary colors R (red), G (green), and B (blue) each corresponding to each of the liquid crystal cell 5 are arranged repeatedly in order of R, G, and B colors each corresponding to each of the liquid crystal cell 5 in a row direction and color filters for the same colors are arranged repeatedly in a column direction, and one pixel is made up of three dot pixel portions 4 for the R, G, and B colors. Therefore, the number of dot pixel portions 4 of the LCD of the example is 3840 ×1024 pixels. Hereinafter, a shape of an image to be displayed is expressed by the number of the dot pixel portions 4. In FIG. 12, a central window portion is of a quadrangular shape made up of 3072×256 pixels by which a white color is displayed, and the background portion surrounding the above window portion has a width of 384 pixels and formed in a shape of the character "□", which displays a stripe in which a white and a black color alternately and repeatedly appear for each pixel made up of three dot pixels portions 4 for the R, G, and B colors. Moreover, to drive the above color LCD, a dot reverse driving method is employed in which a data signal whose voltage to be applied to the pixel electrode 6 is reversed for every dot pixel portion 4 relative to a common voltage $V_{com}$ being applied to the common electrode 8, is fed to the signal line 3. The dot reverse driving method is conventionally used widely for driving the color LCD because a life of the color LCD is shortened if the voltage of a same polarity continues to be applied to its liquid crystal cell 5 and because, even if the voltage to be applied to the liquid crystal cell 5 becomes opposite in polarity, the liquid crystal 5 can maintain all the same transmitted light characteristic. Moreover, in this color LCD, a so-called normally black mode in which, in a state of no voltage applied, transmittance of light through the liquid crystal is low, is employed and, when an absolute value of a voltage to be applied to the liquid crystal layers in the three dot pixels portions 4 for R, G, and B colors making up one pixel is approximately 0 volts, a black color is displayed while an absolute value of the voltage to be applied to the liquid crystal layers in the three dot pixels portions 4 for the R, G, and B colors making up one pixel is approximately 5 volts, a white color is displayed.

First, to the liquid crystal layer in each of dot pixel portions 4 connected to the scanning lines 2 which transverses across a background portion shown in FIG. 12 is applied a data signal having a voltage shown in FIG. 13A. That is, to the liquid crystal layer in the dot pixel portions 4 for the R and B colors, out of the three dot pixels portions 4 for the R, G, and B colors making up one pixel to display a white color, is applied a voltage having an absolute value of Vp (in the example, 5 V) which is of positive polarity relative to the common voltage Vcom and to the liquid crystal layer in the dot pixel portion 4 for the G color is applied a voltage having an absolute value of Vp (in the example, 5 V) which is of negative polarity relative to the common voltage Vcom. On the other hand, to the liquid crystal layer in the dot pixel portions 4 for the R and B colors, out of the three dot pixels portions 4 for the R, G, and B colors making up one pixel to display a black color, is applied a voltage having an absolute value of approximately 0 V which is of positive polarity relative to the common voltage Vcom and to the liquid crystal layer in the dot pixel portion 4 for the G color is applied a voltage having an absolute value of approximately 0 V which is of negative polarity relative to the common voltage Vcom. When the data signal having voltages shown in FIG. 13A is fed through the signal line 3 to the liquid crystal layer in each of the dot pixel portions 4, the common voltage Vcom is changed by a coupling capacitor existing between each of the signal lines 3 and each of the common signal line 9 to which the common voltage Vcom is applied. Though the number of dot pixel portions 4 connected to one scanning line 2 is made up of 3840 pixels, since the stripe in which the white color and the black color appears repeatedly for one pixel in the background portion and the voltage having an absolute value of 0 V is applied to a half (1920 pixels) of the pixels of the dot pixel portion 4 displaying the black color, the applied voltage hardly contributes to the change in the common voltage Vcom. Moreover, out of the three dot pixels 4 portions 4 for the R, G, and B colors making up one pixel, though a polarity of the liquid crystal layers in the dot pixel portion for the R color and the liquid crystal layer in the dot pixel portion 4 for the G color being adjacent to each other is different, since the voltage having the same absolute value Vp (in the example, 5 V) is applied, the change in the common voltage Vcom is cancelled out. That is, out of the dot pixel portion 4 made up of 3840 pixels, the dot pixel portion 4 contributing to the change in the common voltage Vcom is the dot pixel portion 4 for the B color making up the pixel displaying the white color and the number of pixels making up the dot pixel portion 4 is 640 pixels as obtained by an equation (1).

$$3840/(2\times 3)=640 \qquad (1)$$

Thus, due to an influence of the voltage having an absolute value 5 V applied to the liquid crystal layer of 640 pixels out of the 3840 pixels, the common voltage Vcom is changed to be a common voltage V' com as shown in FIG. 13 (1). Because of this, since same results occur as if a voltage having an absolute value Vp1 being smaller than the absolute value of Vp were to be applied to the liquid crystal layer in the dot pixel portions 4 for the R and B colors and as if a voltage having an absolute value Vp2 being larger than the absolute value of Vp were to be applied to the liquid crystal layer in the dot pixel portion 4 for the G color, a stripe in greenish color, as a whole, instead of the stripe in the white and black colors originally expected, is displayed in the background portion. Moreover, when the color filters for three colors are arranged in order of the G, R, and B colors, a stripe in reddish color as a whole is displayed. When the color filters for three colors are arranged in order of the R, B, and G colors, a stripe in bluish color as a whole is displayed. Such the phenomenon is hereinafter called color degradation.

On the other hand, to the liquid crystal layer in each of the dot pixel portion 4 connected to the scanning line 2 which transverses across the window shown in FIG. 12 is applied a data signal having voltages shown in FIG. 13B. That is, in the background portion and the window portion, to the liquid crystal layer in the dot pixel portions 4 for the R and B colors, out of the three dot pixels portions 4 for the R, G, and B colors making up one pixel displaying a white color, is applied a voltage having an absolute value of Vp (in the example, 5 V) which is of positive polarity relative to the common voltage Vcom and to the liquid crystal layer in the dot pixel portion 4 for the G color is applied a voltage having an absolute value of Vp (in the example, 5 V) which is of negative polarity relative to the common voltage Vcom. On the other hand, to the liquid crystal layer in the dot pixel portions 4 for the R and B colors, out of the three dot pixels portions 4 for the R, G, and B colors making up one pixel to display the black color, is applied a voltage having an absolute value of approximate 0 V which is of positive polarity relative to the common voltage Vcom and to the liquid crystal layer in the dot pixel portion 4 for the G color is applied a voltage having an absolute value of approximate 0 V which is of negative polarity relative to the common voltage Vcom. In this case, when the data signal having voltages shown in FIG. 13A is applied through the signal line 2 to the liquid crystal layer in each of the dot pixel portion 4 connected to the same scanning line 2, though, due to the coupling capacitor existing between each of the signal lines 3 and the common signal line 9 to which the common voltage Vcom is applied, the common voltage Vcom is changed, an amount of the change is smaller when compared with the case shown in FIG. 13A. That is, in the dot pixel portion 4 made up of 3072 pixels forming the window portion, out of the dot pixel portion 4 made up of 3840 pixels, since a voltage having an absolute voltage of Vp (in the example, 5 V) is applied to the liquid crystal layers in all dot pixel portions 4, the change in the common voltage Vcom between the dot pixel portions 4 being adjacent to each other is cancelled out. In the dot pixel portion 4 made up of 768 pixels (3840 pixels–3072 pixels) forming the background portion, since the same as in the case shown in FIG. 13A can be applied thereto, the dot pixel portion 4, out of the dot pixel portion 4 made up of 3840 pixels, contributing to the change in the common voltage Vcom is the dot pixel portion 4 for the B color making up the pixel to display the white color in the dot pixel portion 4 made up of 768 pixels forming the background portion, the number of the pixels of which is 128 pixels as obtained by an equation (2).

$$(3840-3071)/(2\times 3)=128 \qquad (2)$$

Thus, due to an influence by the voltage having the absolute value of 5 V applied to the liquid crystal layer in the dot pixel portion 4 made up of 128 pixels, out of the dot pixel portion 4 made up of 3840 pixels, the common voltage Vcom is changed to the common voltage V' com as shown in FIG. 13B, however, the change is smaller when compared with the case shown in FIG. 13A. Therefore, the color degradation described above is reduced. A phenomenon that a difference is produced in the color degradation between the dot pixel portion 4 connected to the scanning line 2 traversing across the background portion and the dot pixel portion 4 connected to the scanning line 2 traversing across the window portion is hereinafter called horizontal stroke. Such the phenomena as the color degradation or horizontal stroke occur because wiring resistance at each of the routing sections $10_{a1}$ to $10_{a6}$, $10_{b1}$ to $10_{b6}$, and $10_{c1}$ to $10_{c6}$ is comparatively large, which causes the common voltage Vcom to be applied to these routing sections to be readily changed.

There is a possibility that such the phenomena as the color degradation and horizontal stroke occur, more or less, even in a TN (Twisted Nematic)—LCD whose dot pixel portion 4 has configurations as shown in FIG. 14 and a common storage (in FIG. 14, same reference numbers are assigned to parts having the same function as those in FIG. 11 and their descriptions are omitted accordingly). The reason is that, if configurations of the routing sections $10_{a1}$ to $10_{a6}$, $10_{b1}$ to $10_{b6}$ and $10_{c1}$ to $10_{c6}$ are approximately the same as those shown in FIG. 19, the resistance at the routing section affects the change in the common voltage more or less. Moreover, in FIG. 14, the common signal line 9 serves also as the common electrode 8.

Since each of the routing sections $10_{a1}$ to $10_{a6}$, $10_{b1}$ to $10_{b6}$ and $10_{c1}$ to $10_{c6}$ of the common wiring 10 is formed along both ends of the blocks $12_1$ to $12_3$, $13_1$ to $13_3$, and $14_1$ to $14_3$, light from a backlight leaks from a clearance between blocks being adjacent to each other, causing irregularity of luminance at edge portions surrounding the display area 11. This phenomenon is hereinafter called luminance irregularity.

SUMMARY OF THE INVENTION

In view of the above, it is an object of the present invention to provide an LCD capable of reducing wiring resistance at routing sections of common wirings and changes in a common potential to be applied to the common wiring to decrease "color degradation" and "horizontal stroke" and "luminance irregularity" and an image display device equipped with the above LCD.

According to a first aspect of the present invention, there is provided a liquid crystal display including:

a liquid crystal cell disposed at each point of intersections of a plurality of scanning lines, extending in a row direction, mounted at specified intervals in a display area being approximately quadrangular in shape placed at a predetermined position on a glass substrate being approximately quadrangular in shape and of a plurality of signal lines, extending in a column direction, mounted at specified intervals and containing a common electrode;

signal terminals mounted at either or both of upper end portions or lower end portions of the glass substrate at a specified pitch, to which end portions of the signal lines routed to either or both of an upper portion on an upper side or of a lower portion on a lower side of the display area and divided into two or more blocks and gathered are connected;

scanning terminals mounted at either or both of left end portions or right end portions of the glass substrate at a specified pitch, to which end portions of the scanning lines routed to either or both of a left portion on a left side or of a right portion on a right side of the display area and divided into two or more blocks and gathered are connected;

common signal lines each being mounted in each row and each column in the display area used to apply a common voltage to the common electrode;

common wirings each being mounted at either or both of an upper portion on an upper side or of a lower portion on a lower side of the display area and mounted at either or both of a left portion on a left side or of a right portion on a right side of the display area, to which each of end portions of a plurality of the common signal lines is connected;

a first routing section made up of a metal film having very low transmittance of light emitted from a backlight and formed in a manner that a gap between blocks being adjacent to each other along one side of the display area is almost filled in, and wherein one portion facing the display area of which is connected to the common wiring;

a second routing section made up of the metal film and formed in a manner that a region surrounded by an outer side portion of each of the blocks and by straight lines being four side lines of the display area being extended toward an end portion of the glass substrate is almost filled in, and wherein the one portion facing the display area of which is connected to the common wiring; and a plurality of common terminals mounted so as to be adjacent to the signal terminal or the scanning terminal connected to an end portion of each of the signal lines or the scanning lines making up an outermost portion of each of the blocks and formed on the first routing section and the second routing section at an end portion of the glass substrate.

In the foregoing, a preferable mode is one wherein the first routing section and the second routing section formed at either or both of the left portion on the left side or of the right portion on the right side of the display area are formed on a same layer as a plurality of the scanning lines is formed and connected to the common wiring through a contact hole and wherein the first section and the second section formed at either or both of the upper portion on the upper side or of the lower portion on the lower side of the display area are formed on a same layer as a plurality of the signal lines is formed and connected to the common wiring through the contact hole.

According to a second aspect of the present invention, there is provided a liquid crystal display including:

a liquid crystal cell disposed at each point of intersections of a plurality of scanning lines, extending in a row direction, mounted at specified intervals in a display area being approximately quadrangular in shape placed at a predetermined position on a glass substrate being approximately quadrangular in shape and of a plurality of signal lines, extending in a column direction, mounted at specified interval, and containing a common electrode;

signal terminals mounted at either or both of upper end portions or lower end portions of the glass substrate at a specified pitch, to which end portions of the signal lines routed to either or both of an upper portion on an upper side or of a lower portion on a lower side of the display area and divided into two or more blocks and gathered are connected;

scanning terminals mounted at either or both of left end portions or right end portions of the glass substrate at a specified pitch, to which ends of the scanning lines routed to either or both of a left portion on a left side or of a right portion on a right side of the display area and divided into two or more blocks and gathered are connected;

common signal lines each being mounted in each row and each column in the display area used to apply a common voltage to the common electrode;

common wirings each being mounted at either or both of an upper portion on an upper side or of a lower portion on a lower side of the display area and mounted at either or both of a left portion on a left side or of a right portion on a right side of the display, to which each of end portions of a plurality of the common signal lines is connected;

a first routing section made up of a metal film having very low transmittance of light emitted from a backlight and formed in a manner that a gap between blocks, being adjacent to each other, formed in a manner so as to surround the display area, is almost filled in, and wherein one portion facing the display area of which is connected to the common wiring;

a second routing section made up of the metal film and formed in a manner that a region surrounded by an outer side portion of each of the blocks and by a straight line being one side being orthogonal to one side of the display area along which the block contacts, being extended toward an end portion of the glass substrate, is almost filled in, and wherein one portion facing the display area of which is connected to the common wiring; and a plurality of common terminals mounted so as to be adjacent to the signal terminal or the scanning terminal connected to an end portion of the signal line or the scanning line making up an outermost portion of each of the blocks and formed on the first and second routing sections at an end portion of the glass substrate.

In the foregoing, a preferable mode is one wherein the first routing section facing a corner portion of the display area is made up of a first approximate trapezoidal portion formed on a same layer as a plurality of the scanning lines is formed and of a second approximate trapezoidal portion formed on a same layer as a plurality of the signal lines is formed, wherein the first approximate trapezoidal portion is formed in a manner that it reaches a place being positioned opposite to the scanning line disposed at an outermost portion of the adjacent blocks where a straight line connecting an end of each of the signal terminals mounted at the specified pitch and an end of each of the scanning terminals on a side of the display area is extended and where the common wiring is extended, wherein the second approximate trapezoidal portion is formed in a manner that it reaches a place being positioned opposite to the signal line disposed at an outermost portion of the adjacent blocks where a straight line connecting an end of each of the signal terminals mounted at the specified pitch and an end of each of the scanning terminals on a side of the display area is extended and where the common wiring is extended, and wherein the first approximate trapezoidal portion and the second approximate trapezoidal portion are connected to each other at a portion where they are overlapped through contact holes with specified numbers and at a specified pitch.

Also, a preferable mode is one wherein each of the common wirings is made up of a longitudinal line and a horizontal line contacting sides of the display area and wherein the longitudinal line is formed on a same layer as a plurality of the signal lines is formed and the horizontal line is formed on a same layer as a plurality of the scanning lines is formed and the common wirings are connected to each other at a region where the longitudinal line and horizontal line are overlapped through contact holes and wherein each of the common signal lines is formed on a same layer as each of a plurality of the scanning lines is formed and connected to the longitudinal line through contact holes.

Furthermore, a preferable mode is one wherein the first routing section the and second routing section are formed in a manner that each of the routing sections is placed far, by an interval being equal to a predetermined pitch, from the scanning lines or the signal lines being positioned at outermost portions of blocks adjacent to each other.

According to a third aspect of the present invention, there is provided an image display device including a liquid crystal display stated above.

With the above configurations, there are provided a first routing section made up of a metal film having very low transmittance of light emitted from a backlight and formed in a manner that a gap between blocks being adjacent along one side of a display area is almost filled in and a second routing section made up of the above metal film and formed in a manner that a region surrounded by an outer side portion of a block mounted outside the display area and by straight lines being four sides of the display area which have extended toward end portions of a glass substrate are almost filled in and, therefore, wiring resistance at a routing section of common wirings can be reduced and changes in common potential to be applied to the common wirings can be reduced, which enables "color degradation" and "horizontal stroke" to be decreased in the LCD. Also, by using the metal film having very low transmittance of light, "luminance irregularity" can be also reduced.

BRIEF DESCRIPTION OF THE DRAWINGS

The above and other objects, advantages, and features of the present invention will be more apparent from the following description taken in conjunction with the accompanying drawings in which:

FIGS. 13A and 13B are diagram explaining inconvenient-points in the conventional LCD.

DETAILED DESCRIPTION OF THE PREFERRED EMBODIMENTS

Best modes of carrying out the present invention will be described in further detail using various embodiments with reference to the accompanying drawings.

First Embodiment

Figure 1:
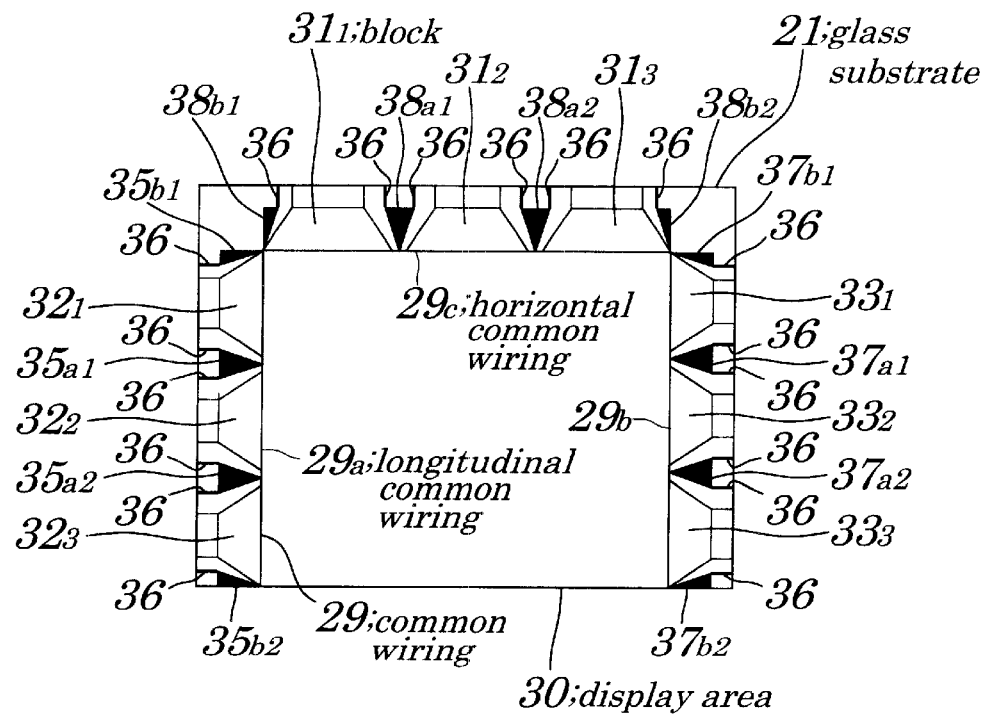
FIG. 1 is a top view showing configurations of an LCD according to a first embodiment of the present invention.
Figure 2:
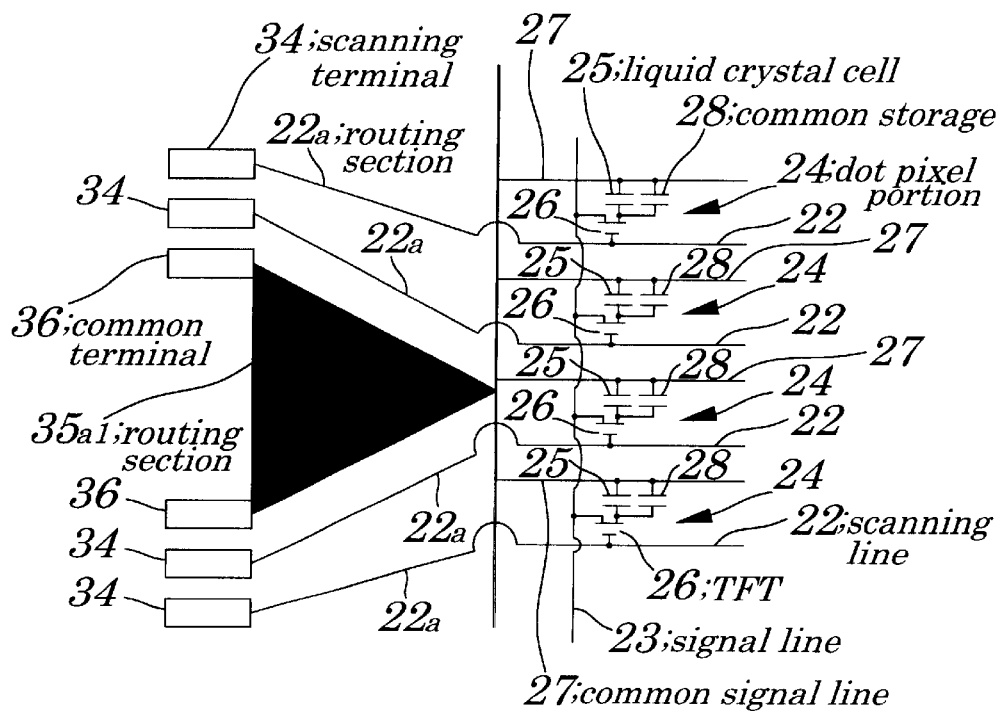
FIG. 2 is an enlarged schematic equivalent circuit of a portion of the LCD according to the first embodiment of the present invention.

FIG. 1 is a top view showing configurations of an LCD according to a first embodiment of the present invention. FIG. 2 is an enlarged schematic equivalent circuit of a portion of the LCD according to the first embodiment of the present invention. The LCD of the first embodiment is an active-matrix LCD using a TFT as a switching element. As shown in FIG. 2, on an approximately quadrangular glass substrate 21 (refer to FIG. 1) are provided a dot pixel portion 24 surrounded by each of a plurality of scanning lines 22 mounted at specified intervals in a column direction (in a longitudinal direction in the figure) and by each of a plurality of signal lines 23 mounted at specified intervals in a row direction (in a transverse direction in the figure), a liquid crystal cell 25 mounted for each of the dot pixel portions 24 and having a liquid crystal layer serving equivalently as a capacitive load, a pixel electrode (not shown) and a common electrode (not shown) placed in a manner to be opposite to each other so that they sandwich the liquid crystal layer of the liquid crystal cell 25 and a TFT 26 whose source is connected to one end of the corresponding pixel electrode. Moreover, the LCD of the embodiment can be considered as a capacitor made up of the liquid crystal layer in the liquid crystal cell 25 being equivalently a dielectric, the pixel electrode and the common electrode placed in a manner to be opposite to each other so that they sandwich the liquid crystal layer, and is connected to the liquid crystal cell 25 in parallel and made up of common storage 28 used to accumulate a signal charge for one vertical sync period. In the LCD of the embodiment, in a state in which a common voltage Vcom is being applied to the common electrode through a common signal line 27 mounted in each column and in each row, a data signal produced based on a video signal is fed to the signal lines 23 and a scanning signal produced based on a horizontal sync signal and vertical sync signal is applied to the scanning lines 22, thus causing a character, image, or a like to be displayed.

Each of the common signal lines 27 is formed on the same layer as the scanning lines 22 are formed and is connected through a contact hole to common wiring 29 (FIG. 1) formed in a shape of an approximate character "⊐" (or an approximate character "☐") in a manner so as to surround an approximately quadrangular display area 30 in which the dot pixel portions 24 are arranged in a matrix form (refer to FIG. 1). Longitudinal common wirings $29_a$ and $29_b$ of the common wiring 29 are formed on the same layer as the signal lines 23 are formed and a horizontal common wiring $29_c$ of the common wiring 29 is formed on the same layer as the scanning line 22 is formed and at regions where the longitudinal wirings $29_a$ and $29_b$ and the horizontal common wiring $29_c$ are overlapped, the above longitudinal common wirings $29_a$ and $29_b$ are connected to each other, thus causing these wirings to be formed in the shape of the approximate character "⊐" (or an approximate character "☐").

In the LCD shown in FIG. 1, all the signal lines 23 are routed to an upper portion on an upper side of the display area 30 and divided into three blocks $31_1$ to $31_3$ and a plurality of the signal lines 23 making up each of the blocks $31_1$ to $31_3$ is gathered in a manner to form an approximately trapezoidal shape and an end of each of the signal lines 23 is connected to each of corresponding signal terminals (not shown) arranged at a predetermined pitch. Similarly, all the scanning lines 22 are routed both to a right portion on a right side of the display area 30 and to a left portion on a left side of the display area 30 and divided into three blocks $32_1$ to $32_3$ and $33_1$ to $33_3$ and a plurality of scanning lines 22 making up each of the blocks $32_1$ to $32_3$ and of the blocks $33_1$ to $33_3$ is gathered in a manner to form an approximately trapezoidal shape and an end of each of the scanning lines 22 is connected to each of corresponding scanning terminals 34 arranged at a predetermined pitch (see FIG. 2). A pair of the scanning terminals 34 disposed in a position symmetrical right and left is connected to each other through the same scanning line 22.

Moreover, in the left portion on the left side of the display area 30, routing sections $35_{a1}$ and $35_{a2}$ are formed between the blocks $32_1$ and $32_3$ and between the blocks $32_2$ and $32_3$ and a routing section $35_{b1}$ is formed near an upper side of the block $32_1$ and routing section $35_{b2}$ is formed near a lower side of the block $32_3$. The routing section $35_{a1}$ is formed in a manner that each of its upper and lower portions is placed far, by an interval being equal to a pitch among wirings in a routing section 22a, from the routing section 22a for the scanning lines 22 being positioned at outermost places of blocks $32_1$ and block $32_2$ and in a manner so as to form an approximate isosceles triangle so that a gap between the block $32_1$ and the block $32_2$ is filled in and is constructed of a metal film having very low transmittance of light emitted from a backlight. Also, the routing section $35_{a2}$ is constructed of the metal film described above and formed in a manner that each of its upper and lower portions is placed far, by an interval being equal to a pitch among wirings in the routing section 22a, from the routing section 22a for the scanning lines 22 being positioned at outermost places of blocks $32_1$ and block $32_2$ and in a manner so as to form an approximate isosceles triangle so that a gap between the block $32_2$ and the block $32_3$ is filled in. Each of first vertexes of the routing section $35_{a1}$ and $35_{a2}$ facing the display area 30 is formed in a manner that the first vertex and the longitudinal common wiring $29_a$ formed on the same layer as the signal lines 23 is formed are partially overlapped and, at the overlapped place, a vertex is partially connected through a contact hole to the longitudinal common wiring $29_a$. Moreover, second and third vertexes of the routing section $35_{a1}$ and $35_{a2}$ positioned on a left end side of the glass substrate 21 are connected to common terminals 36 formed on the same layer on the left side of the glass substrate 21 as the scanning lines 22 are formed.

The routing section $35_{b1}$ is constructed of the metal film described above and formed in a manner that its lower portion is placed far, by an interval being equal to a pitch among wirings in the routing section 22a, from the routing section 22a for the scanning lines 22 being positioned at an outermost place of adjacent blocks $32_1$ and in a manner so as to form an approximately right triangle so that its upper side reaches a place where the horizontal common wiring $29_c$ is extended in a left direction. The routing section $35_{b2}$ is constructed of the metal film described above and formed in a manner that its upper portion is placed far, by an interval being equal to a pitch among wirings in the routing section 22a, from the routing section 22a for the scanning lines 22 being positioned at an outermost place of adjacent blocks $32_3$ and in a manner so as to form an approximately right triangle so that its lower side reaches a place where a lower end of the display area 30 is extended in a left direction. A first vertex of the routing section $35_{b1}$ facing the display area 30 is formed in a manner that the first vertex is connected to a left end of the horizontal common wiring $29_c$ and that the first vertex and the longitudinal common wiring $29_a$ formed on the same layer as the signal lines 23 is formed are partially overlapped and, at the overlapped place, the vertex is partially connected through a contact hole to the longitudinal common wiring $29_a$. A first vertex of the routing section $35_{b2}$ facing the display area 30 is so formed that the first vertex and the longitudinal common wiring $29_a$ formed on the same layer as the signal line 23 is formed are partially overlapped and, at the overlapped place, the vertex is connected through a contact hole to a part of the longitudinal common wiring $29_a$. Moreover, each of second vertexes of the routing sections $35_{b1}$ and $35_{b2}$ existing in the left end of the glass substrate 21 and at a place opposite to an outermost portion of the adjacent block $32_1$ or $32_3$ is connected to a common terminal 36 formed on the same layer as the scanning lines 22 in the left end of the glass substrate 21 are formed.

Similarly, in the right portion on the right side in the display area 30, routing sections $37_{a1}$ and $37_{a2}$ are formed, respectively, between the blocks $33_1$ and $33_2$ and between the blocks $33_2$ and $33_3$ on the same layer as the scanning lines 22 are formed and the routing sections $37_{b1}$ and $37_{b2}$ are formed, respectively, near an upper side of the block $33_1$ and near a lower side of the block $33_3$. Since shapes of the routing sections $37_{a1}$, $37_{a2}$, $37_{b1}$, and $37_{b2}$ and their connections with the longitudinal common wirings $29_a$ and $29_b$, horizontal common wiring $29_c$ and the common terminal 36 are almost the same as in the cases of the routing sections $35_{a1}$, $35_{a2}$, $35_{b1}$, and $35_{b2}$ except that shapes and positions of the both left and right routing sections are symmetric with respect to a line; therefore their descriptions are omitted accordingly.

In the upper portion on the upper side of the display area 30, routing sections $38_{a1}$ and $38_{a2}$ are formed, respectively, between the blocks $31_1$ and $31_2$ and between the blocks $31_2$ and $31_3$ on the same layer as the signal lines 23 are formed and routing sections $38_{b1}$ and $38_{b2}$ are formed, respectively, near a left side of the block $33_1$ and near a right side of the block $31_3$. The routing section $38_{a1}$ is constructed of the metal film described above and formed in a manner that each of its left and right portions is placed far, by an interval being equal to a pitch among wirings in the routing section $23_a$ (not shown), from the routing section $23_a$ for the signal lines 23 being positioned at outermost places of blocks $31_1$ and block $31_2$ being adjacent to each other and in a manner so as to form an approximate isosceles triangle so that a gap between the block $31_1$ and the block $31_2$ is filled in. The routing section $38_{a2}$ is constructed of the metal film described above and formed in a manner that each of its left and right portions is placed far, by an interval being equal to a pitch among wirings in the routing section $23_a$, from the routing section $23_a$ for the signal lines 23 being positioned at outermost places of blocks $31_1$ and block $31_2$ being adjacent to each other and in a manner so as to form an approximate isosceles triangle so that a gap between the block $31_1$ and the block $31_2$ is filled in. Each of first vertexes of the routing sections $38_{b1}$ and $38_{b2}$ facing the display area 30 is so formed that the first vertex and the horizontal common wiring $29_c$ formed on the same layer as the scanning line 22 is formed are partially overlapped and, at the overlapped place, the vertex is connected through a contact hole to a part of the horizontal common wiring $29_c$.

Moreover, each of second and third vertexes of the routing sections $38_{a1}$ and $38_{a2}$ placed on an upper side of the glass substrate 21 is connected to the common terminal 36 formed on the same layer as the signal line 23 on an upper end of the glass substrate 21 is formed.

The routing section $38_{b1}$ is constructed of the metal film described above and formed in a manner that its right side portion is placed far, by an interval being equal to a pitch among wirings in the routing section $23_a$, from the routing section $23_a$ for the signal lines 23 being positioned at an outermost place of adjacent blocks $31_1$ and in a manner so as to form an approximately right triangle so that its left side portion reaches a place where the longitudinal common wiring $29_a$ is extended in a upper direction. The routing section $38_{b2}$ is constructed of the metal film described above and formed in a manner that its left side portion is placed far, by an interval being equal to a pitch among wirings in the routing section $23_a$ from the routing section $23_a$ for the signal lines 23 being positioned at an outermost place of adjacent blocks $31_3$ and in a manner so as to form an approximately right triangle so that its right side portion reaches a place where the longitudinal common wiring $29_b$ is extended in a upper direction. A first vertex of the routing section $38_{b1}$ facing the display area 30 is connected to an upper end of the longitudinal common wiring $29_a$ and is so formed that the vertex and the horizontal common wiring $29_c$ formed on the same layer as the scanning line 22 is formed are partially overlapped and, at the overlapped place, the vertex is connected through a contact hole partially to the horizontal common wiring $29_c$. A first vertex of the routing section $38_{b2}$ facing the display area 30 is connected to an upper end of the longitudinal common wiring $29_b$ and the vertex and the horizontal common wiring $29_c$ formed on the same layer as the scanning line 22 is formed are partially overlapped and, at the overlapped place, the vertex is connected through a contact hole partially to the horizontal common wiring $29_c$. Moreover, each of second vertexes of the routing sections $38_{b1}$ and $38_{b2}$ existing in the upper end of the glass substrate 21 and at a place opposite to an outermost portion of the adjacent block $31_1$ or $31_3$ is connected to the common terminal 36 formed on the same layer as the signal lines 23 in the upper end of the glass substrate 21 are formed.

The LCD of the embodiment, when the TCP is connected, by a thermo compression bonding method, to the scanning terminal 34 connected to the scanning lines 22 gathered in a blocked form and the signal terminal (not shown) connected to the signal lines 23 gathered in a blocked form and the common terminal 36 connected to the common wiring 29, is connected to a driving circuit mounted on the TCP or on a printed board through the TCP.

Thus, according to the LCD of the embodiment, since each of the routing sections $35_{a1}$, $35_{a2}$, $35_{b1}$, $35_{b2}$, $37_{a1}$, $37_{a2}$, $37_{b1}$, $37_{b2}$, $38_{a1}$, $38_{a2}$, $38_{b1}$, and $38_{b2}$ is constructed of the metal film having very low transmittance of light emitted from the backlight in a manner that the gap between blocks is almost filled in or a region surrounded by side portions of the blocks formed outside the display area 30 and by straight lines extended from four sides of the display area 30 is filled in, wiring resistance at the routing sections $35_{a1}$ or the like can be reduced more when compared with the case of the conventional LCD. Therefore, even if the LCD of this embodiment is operated in a normally black mode and the color filters for the R, G, and B colors are arranged in a stripe form and an image is displayed by using a dot reverse driving method, since change in a common potential to be applied to the common wiring 29 can be reduced more when compared with the case of the conventional LCD, color degradation or horizontal stroke can be reduced. Moreover, since the routing sections $35_{a1}$ or the like are constructed of such metal films having very low transmittance of light emitted from the backlight, the "luminance irregularity" occurring at an edge portion surrounding the display area 30 caused by a leak of light emitted from the backlight from the gap between adjacent blocks can be reduced.

Second Embodiment

Figure 3:
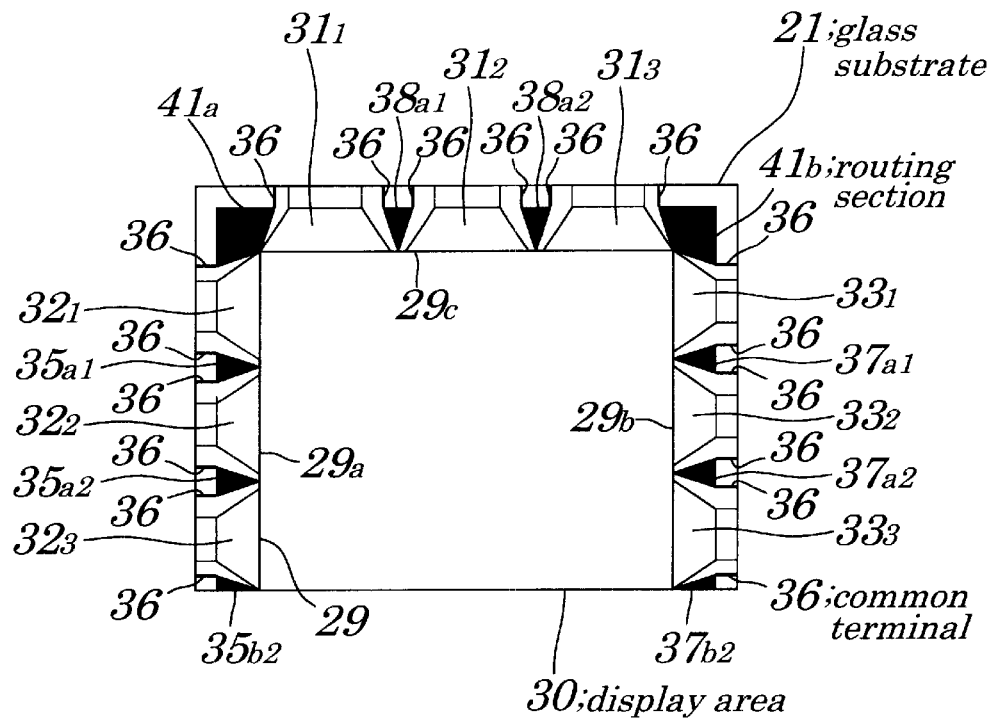
FIG. 3 is a top view showing configurations of an LCD according to a second embodiment of the present invention.

FIG. 3 is a top view showing configurations of an LCD according to a second embodiment of the present invention. In FIG. 3, same reference numbers are assigned to parts or portions having same functions as those in FIG. 1 or FIG. 2 and their descriptions are omitted accordingly. In the LCD shown in FIG. 3, instead of routing sections $35_{b1}$, $37_{b1}$, $38_{b1}$, and $38_{b2}$ provided in FIG. 1, routing sections $41_a$ and $41_b$ are formed.

The routing section $41_a$ is made up of a first approximately trapezoidal portion formed on a same layer as scanning lines 22 (shown in FIG. 2) are formed and a second approximately trapezoidal portion formed on a same layer as signal lines (shown in FIG. 1) 23 are formed.

The first approximately trapezoidal portion is constructed of a metal film described above (in the First Embodiment) and formed in a manner that its lower side portion is placed far, by an interval being equal to a pitch among wirings in routing section $22_a$ (shown in FIG. 1), from the routing section $22_a$ for the scanning lines 22 being positioned at an outermost place of an adjacent block $32_1$ and in a manner so as to form an approximate trapezoid so that its upper side portion reaches a place where a straight line connecting each of lower portions of signal terminals (not shown) mounted at a specified interval in an upper portion on an upper side of a display area 30 is extended in a left direction and its left side portion reaches a place where a straight line connecting each of right portions of scanning terminals (not shown) mounted at specified intervals in a left portion on a left side of the display area 30 is extended in an upper direction and its right side portion reaches a place where a longitudinal common wiring $29_a$ is extended in an upper direction. On the other hand, the second approximately trapezoidal portion is constructed of the metal film described above and formed in a manner so as to form an approximate trapezoid so that its lower side portion reaches a place where a horizontal common wiring $29_c$ is extended in a left direction and its upper side portion reaches a place where a straight line connecting each of lower portions of signal terminals mounted at a specified interval in the upper portion on the upper side of the display area 30 is extended in a left direction and its left side portion reaches a place where a straight line connecting each of right portions of scanning terminals mounted at specified intervals in the left portion on the left side of the display area 30 is extended in an upper direction and in a manner that its right side portion is placed far, by an interval being equal to a pitch among wirings in a routing section $23_a$ (shown in FIG. 1), from the routing section $23_a$ for the scanning lines 22 being positioned at an outermost place of an adjacent block $31_1$.

The routing section $41_a$ is connected, at an approximately regular quadrangular portion where the first and second approximately trapezoidal portions are overlapped, through contact holes with specified numbers and at a specified pitch, to the routing section $41_b$. A first vertex of the first approximately trapezoidal portion facing the display area 30 is connected to a left end portion of the horizontal common wiring $29_c$ and formed in a manner that the first vertex and the longitudinal common wiring $29_a$ formed on the same layer as the signal lines 23 are formed are partially overlapped and, at the overlapped portion, the first vertex is partially connected to the longitudinal common wiring $29_a$ through a contact hole. Moreover, a second vertex being disposed on a left end side of a glass substrate 21 in the above first approximately trapezoidal portion and being placed opposite to an outermost portion of the adjacent block $32_1$ is connected to a common terminal 36, disposed on a left side of the glass substrate 21, formed on the same layer as the scanning lines 22 are formed.

A first vertex of the second approximately trapezoidal portion facing the display area 30 is connected to an upper end portion of the longitudinal common wiring $29_a$ and formed in a manner that the above first vertex and the horizontal common wiring $29_c$ formed on the same layer as the scanning lines 22 are formed are partially overlapped and, at the overlapped portion, the first vertex is partially connected to the horizontal common wiring $29_c$ through a contact hole. Moreover, a second vertex being disposed on an upper end side of the glass substrate 21 in the above second approximately trapezoidal portion and being placed opposite to an outermost portion of the adjacent block $31_1$ is connected to the common terminal 36, disposed on a left side of the glass substrate 21, formed on the same layer as the signal lines 23 are formed.

The routing section $41_b$ is made up of a first approximately trapezoidal portion formed on the same layer as the scanning lines 22 are formed and a second approximately trapezoidal portion formed on the same layer as the signal lines 23 are formed.

The first approximately trapezoidal portion is constructed of the metal film described above and formed in a manner that its lower side portion is placed far, by an interval being equal to a pitch among wirings in the routing section $22_a$, from the routing section $22_a$ for the scanning lines 22 being positioned at an outermost place of an adjacent block $33_1$ and in a manner so as to form an approximate trapezoid so that its upper side portion reaches a place where a straight line connecting each of lower portions of signal terminals mounted at specified intervals in the upper portion on the upper side of the display area 30 is extended in a right direction and its right side portion reaches a place where a straight line connecting each of left portions of scanning terminals mounted at specified intervals in the right portion on the right side of the display area 30 is extended in an upper direction and its left side portion reaches a place where the longitudinal common wiring $29_b$ is extended in an upper direction. On the other hand, the second approximately trapezoidal portion is constructed of the metal film described above and formed in a manner so as to form an approximate trapezoid so that its lower side portion reaches a place where a horizontal common wiring $29_c$ is extended in a right direction and its upper side portion reaches a place where a straight line connecting each of lower portions of signal terminals mounted at specified intervals in the upper portion on the upper side of the display area 30 is extended in a right direction and its right side portion reaches a place where a straight line connecting each of left portions of scanning terminals mounted at specified intervals in the right portion on the right side of the display area 30 is extended in an upper direction and in a manner that its left side portion is placed far, by an interval being equal to a pitch among wirings in the routing section $23_a$, from the routing section $23_a$ for the signal lines 23 being positioned at an outermost place of an adjacent block $31_3$.

The routing section $41_b$ is connected at an approximately regular quadranglar portion where the first and second approximately trapezoidal portions are overlapped, through contact holes with specified numbers and at a specified pitch, to the routing section $41_a$. A first vertex of the first approximately trapezoidal portion facing the display area 30 is connected to a right end portion of the horizontal common wiring $29_c$ and formed in a manner that the first vertex and the longitudinal common wiring $29_b$ formed on the same layer as the signal lines 23 are formed are partially overlapped and, at the overlapped portion, the first vertex is partially connected to the longitudinal common wiring $29_b$ through a contact hole. Moreover, a second vertex being disposed on a right end side of the glass substrate 21 in the above first approximately trapezoidal portion and being placed opposite to an outermost portion of the adjacent block $33_1$ is connected to a common terminal 36, disposed on a right side of the glass substrate 21, formed on the same layer as the scanning lines 22 are formed.

A first vertex of the second approximately trapezoidal portion facing the display area 30 is connected to an upper end portion of the longitudinal common wiring $29_b$ and formed in a manner that the above first vertex and the horizontal common wiring $29_c$ formed on the same layer as the scanning lines 22 are formed are partially overlapped and, at the overlapped portion, the first vertex is partially connected to the horizontal common wiring $29_c$ through a contact hole. Moreover, a second vertex being disposed on an upper end side of the glass substrate 21 in the above second approximately trapezoidal portion and being placed opposite to an outermost portion of the adjacent block $31_3$ is connected to a common terminal 36, disposed on a upper side of the glass substrate 21, formed on the same layer as the signal lines 23 are formed.

Figure 7:
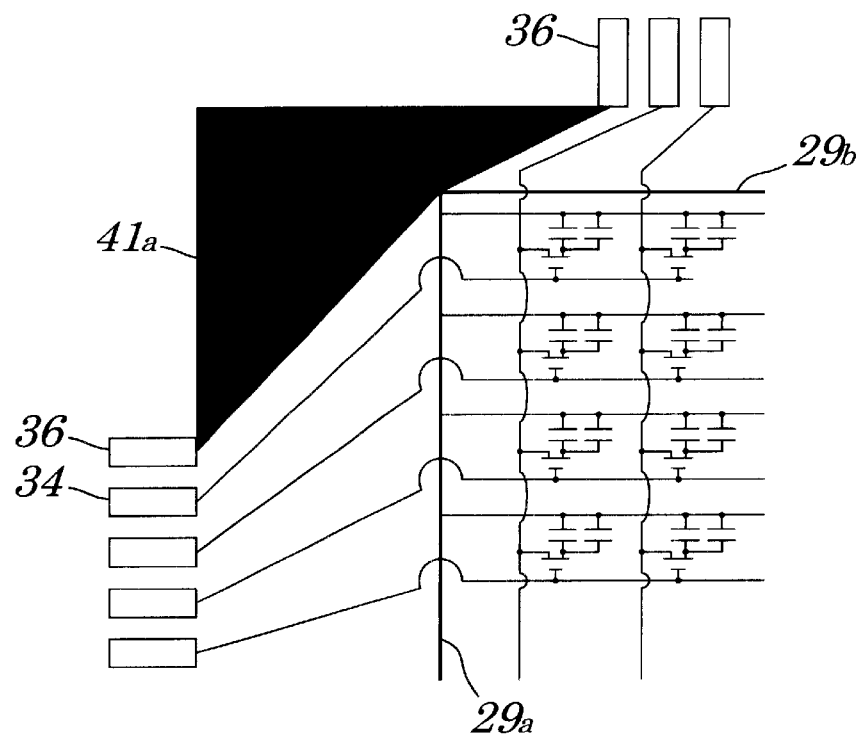
FIG. 7 is an enlarged schematic equivalent circuit of a portion of a fourth modified configuration of the LCD of the present invention.
Figure 8:
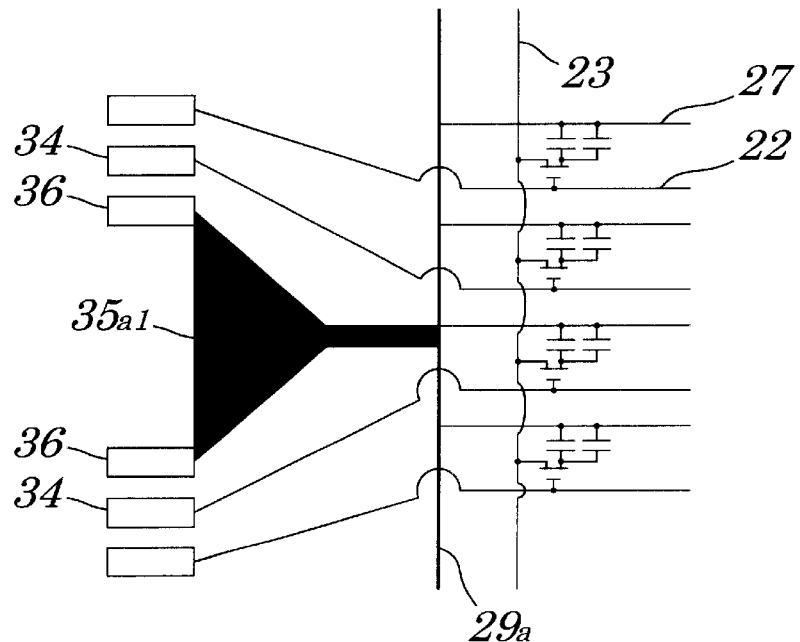
FIG. 8 is an enlarged schematic equivalent circuit of a portion of a fifth modified configuration of the LCD of the present invention.

The LCD of the second embodiment, when a TCP is connected, by a thermo-compression bonding method, to a scanning terminal 34 (FIG. 7) connected to the scanning lines 22 gathered in a blocked form and the signal terminal connected to the signal lines 23 gathered in a blocked form and the common terminal 36 connected to a common wiring 29, is connected to a driving circuit mounted on the TCP or on a printed board through the TCP.

Thus, according to configurations of the LCD of the second embodiment, since the routing sections $41_a$ and $41_b$ made up of the first approximately trapezoidal portion and the second approximately trapezoidal portion, respectively, are constructed of the metal films having very low transmittance of light emitted from a backlight and formed in a manner that a portion surrounded by the left side portion of the block $31_1$ the upper side portion of the block $32_1$ and a terminal forming region and a portion surrounded by the right side portion of the block 313, the upper side portion of the block $33_1$ and a terminal forming region are almost filled in, and since the routing sections $41_a$ and $41_b$ are connected at the approximately regular quadrangular portion where the first and second approximate trapezoidal portions are overlapped, through contact holes with specified numbers and mounted at the specified pitch, wiring resistance at the routing sections $41_1$ and $41_b$ can be reduced more compared with those at the routing sections $35_{b1}$, $37_{b1}$, $38_{b1}$ and $38_{b2}$ provided in the first embodiment. Therefore, in the second embodiment, color degradation, horizontal stroke, and luminance irregularity can be reduced more than in the first embodiment.

As described above, according to the embodiments of the present invention, the wiring resistance at routing sections of the common wirings can be reduced and the color gradation and horizontal stroke can be reduced by lowering changes in a common potential to be applied to the common wiring.

Moreover, since the metal film having very low transmittance of light, the luminance irregularity can be also reduced.

Figure 4:
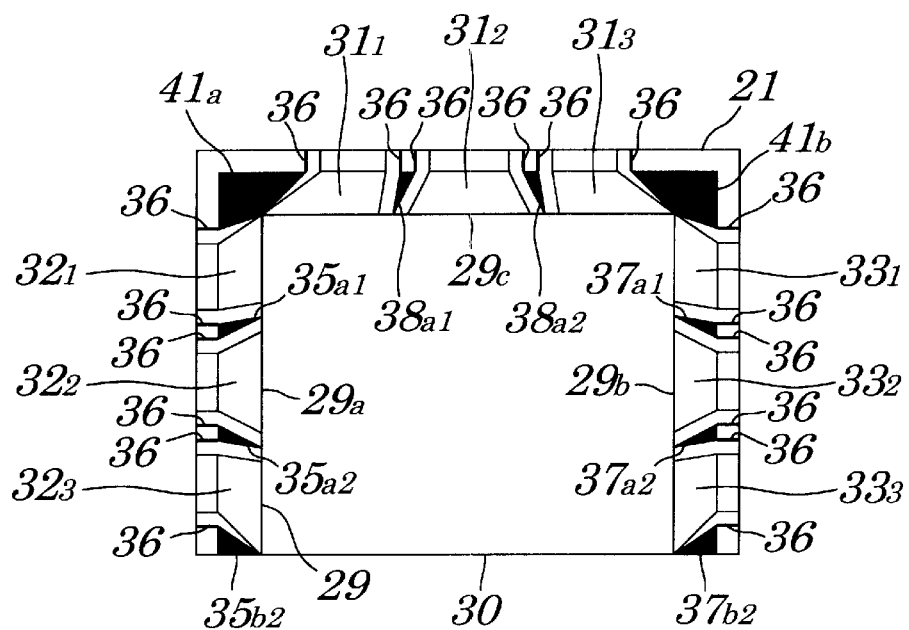
FIG. 4 is a top view showing a first modified configuration of the LCD of the present invention.
Figure 5:
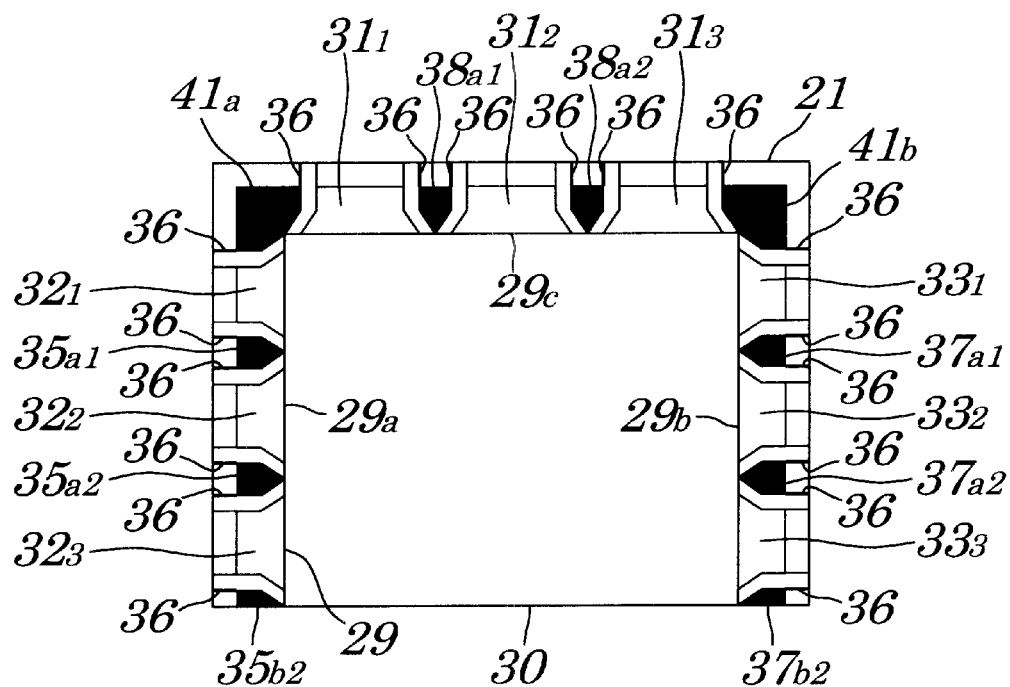
FIG. 5 is a top view showing a second modified configuration of the LCD of the present invention.
Figure 6:
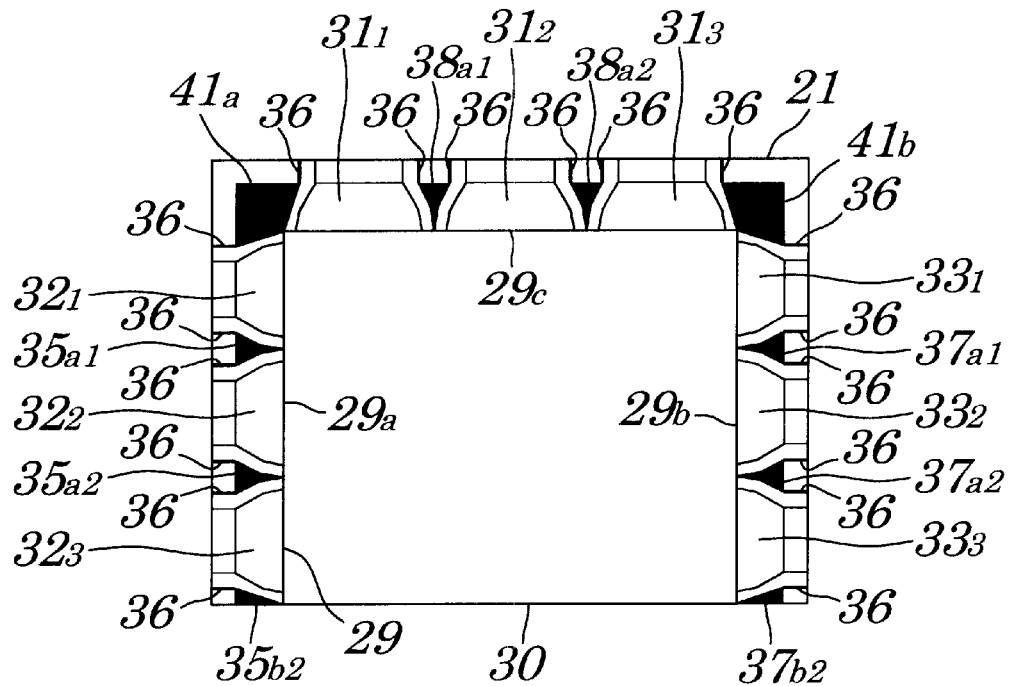
FIG. 6 is a top view showing a third modified configuration of the LCD of the present invention.

It is apparent that the present invention is not limited to the above embodiments but may be changed and modified without departing from the scope and spirit of the invention. For example, in the above embodiments, each of the blocks $31_1$ to $31_3$, $32_1$ to $32_3$, and $33_1$ to $33_3$ is symmetric with respect with a line and of the approximately trapezoidal shape. However, their shapes may be changed; for example, in the case of the LCD with high resolution, since the number of the scanning lines 22 and signal lines 23 is increased, the shape of the blocks $31_1$ to $31_3$, $32_1$ to $32_3$, and $33_1$ to $33_3$ may be changed depending on the number of the lines, as shown in FIG. 4 to FIG. 6. Therefore, a shape of the routing section $35_{a1}$ or the like may be changed in an arbitrary manner so long as no wiring defects occur between the routing section $35_{a1}$ and the routing section $22_a$ or the like making up each of the blocks $31_1$, to $31_3$, $32_1$, to $32_3$, and $33_1$, to $33_3$ and being disposed opposite to each of the routing sections $35_{a1}$ or the like (see FIG. 4 to FIG. 8).

Figure 9:
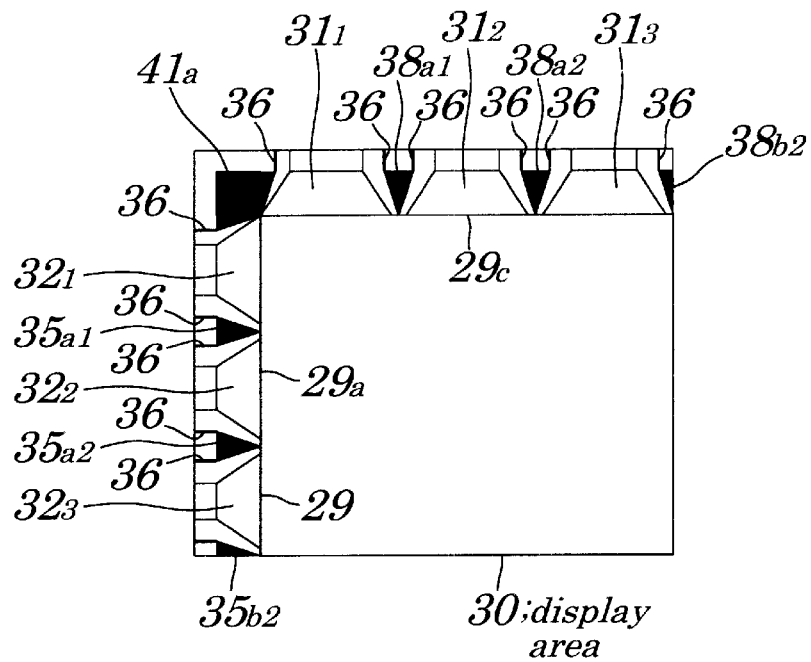
FIG. 9 is a top view showing a sixth modified configuration of the LCD of the present invention.
Figure 10:
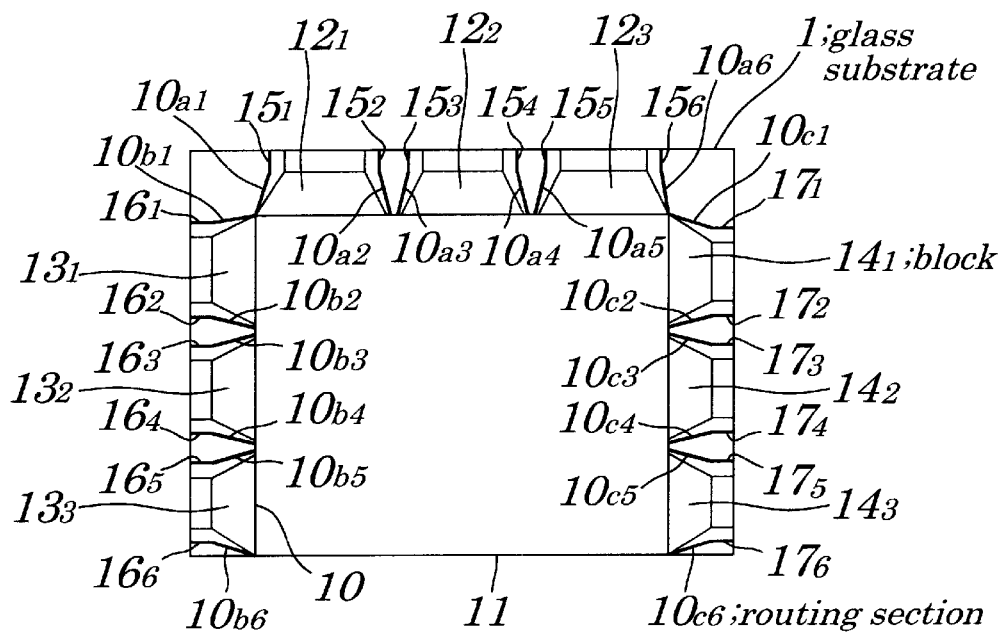
FIG. 10 is a top view of an example of configurations of a conventional LCD.
Figure 11:
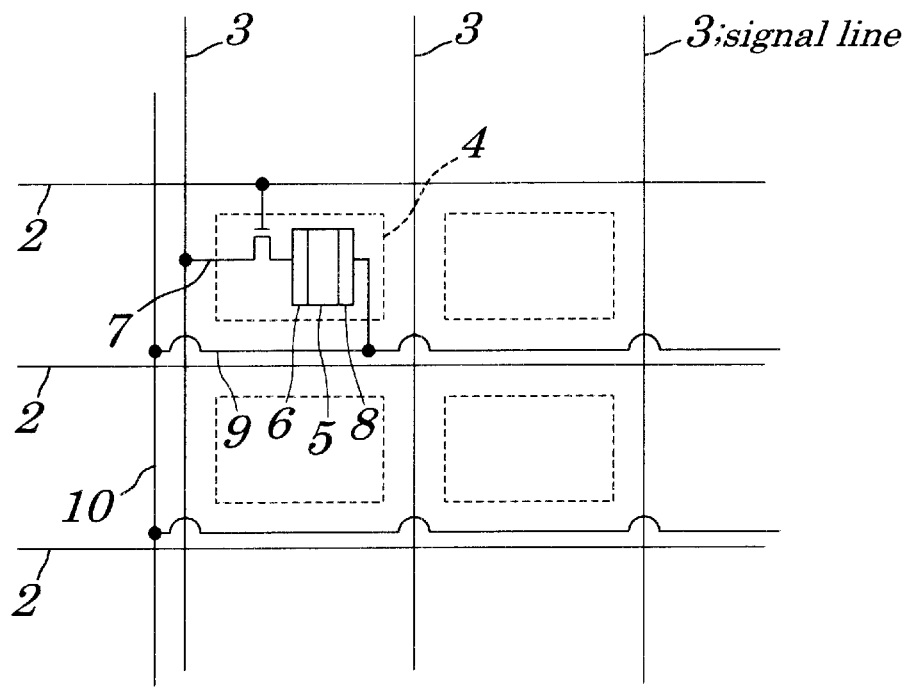
FIG. 11 is an expanded schematic equivalent circuit of a pixel making up the conventional LCD.
Figure 12:
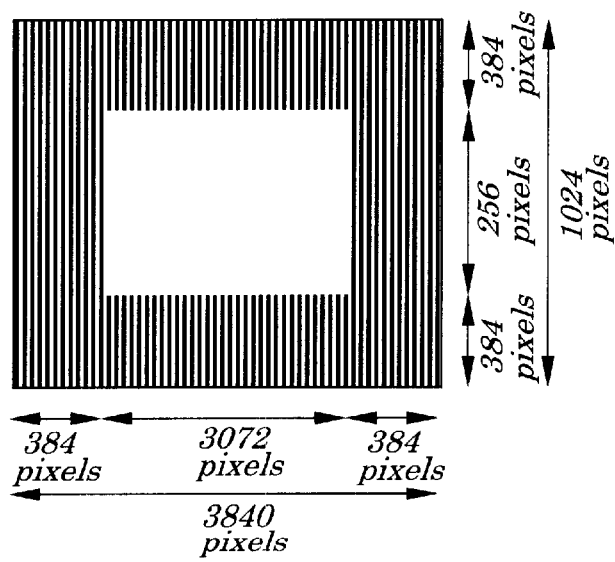
FIG. 12 is a diagram explaining inconvenient points in the conventional LCD.
Figure 14:
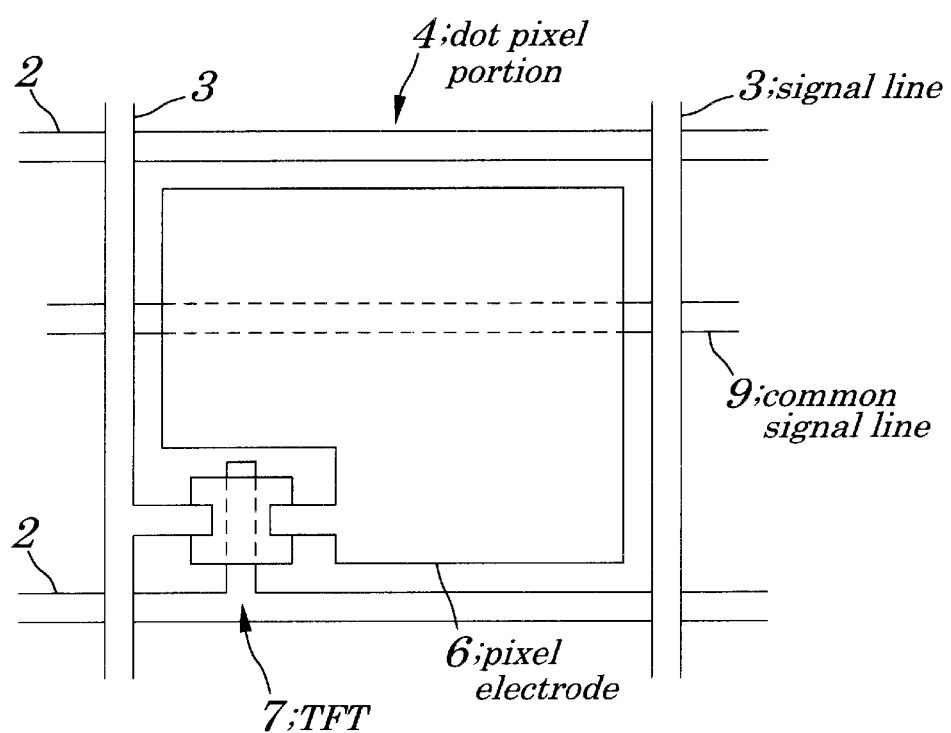
FIG. 14 is an expanded schematic equivalent circuit of the pixel making up the conventional LCD having another configuration.

Moreover, in the above embodiments, all scanning lines 22 are routed to the left and right portions on the left and right sides of the display area 30 and are divided into three blocks on the left and right sides $32_1$ to $32_3$ and $33_1$, to $33_3$, however, in the case of the LCD having the comparatively small display area 30, as shown in FIG. 9, all the scanning lines may be routed to either of the left portion on the left side or the right portion on the right side. The present invention can be applied to the LCD having such routing and, in this case, forming of either of the longitudinal common wiring $29_a$ or $29_b$ is not required accordingly.

Also, in the above embodiments, all the signal lines 23 are routed to the upper portion on the upper side of the display area 30 and are divided into three blocks $31_1$ to $31_3$, however, all the signal lines 23 may be routed to the lower portion on the lower side of the display area 30 and may be divided into three blocks. In this case, instead of the horizontal common wiring $29_1$, a horizontal line is formed at a place corresponding to a lower side of the display area 30. Moreover, in the LCD having a comparatively wider display area, there are cases in which all the signal lines 23 are routed to both the upper portion on the upper side and the lower portion on the lower side of the display area 30 and are divided into three blocks on the upper and lower sides, or the signal lines 23 are divided approximately into two at a center place, one being for the upper side and the other being for the lower side and all the signal lines 23 for the upper side are routed to the upper portion on the upper side of the display area 30 and are divided into three blocks and all the signal lines 23 for the lower side are routed to the lower portion on the lower side of the display area 30 and are then divided into three blocks. The present invention can be applied to the LCD having such the routing. In this case, a horizontal common wiring $29_c$ is formed at a place corresponding to a lower side portion of the display area 30. In any case described above, the shape of the routing section $35_{a1}$ or the like may be selected depending on the shape of the block $31_1$ or the like, as shown in FIG. 4 to FIG. 8. Also, the number of the above blocks is not limited to three and may be set to two, or four, or more.

Also, in the above embodiments, in the upper portion on the upper side of the display area 30, the routing sections $38_{a1}$ and $38_{a2}$ are formed on the same layer on which the signal line 23 is formed and is connected through the contact hole to the horizontal common wiring $29_c$ formed on the same layer on which the scanning line 22 is formed. In the left portion on the left side of and in the right portion on the right side of the display area 30, the routing section $35_{a1}$, $35_{a2}$, $35_{b1}$, $35_{b2}$, $37_{a1}$, $37_{a2}$, $37_{b1}$, $37_{b2}$, $38_{a1}$, $38_{a2}$, $38_{b1}$, and $38_{b2}$ are formed on the same layer on which the scanning line 22 is formed and is connected through the contact hole to the longitudinal common wiring $29_a$ or $29_b$ formed on the same layer on which the signal line 23 is formed. However, the present invention is not limited to this. For example, in the upper portion on the upper side of the display area 30, the routing section is formed on the same layer on which the scanning line 22 may be formed to be directly connected to the horizontal common wiring $29_c$ formed on the same layer on which the scanning line 22 is formed. In the left portion on the left side of and in the right portion on the right side of the display area 30, the routing section is formed on the same layer on which the signal line 23 may be formed to be directly connected the longitudinal common wiring $29_a$ or $29_b$ formed on the same layer on which the signal line 23 is formed.

Moreover, in the above embodiments, the common terminal 36 is connected to any one of the vertex of the routing sections, however, the common terminal 36 may be connected to any part of side portions of the routing section on the glass substrate 21 side or, if possible when the TCP is commonly connected, a wide-shaped common terminal is used to be connected to an entire side portion of the routing section on the end side of the glass substrate 21. As a result, wiring resistance at the routing section can be reduced more. Also, in the above embodiments, examples are shown in which the present invention can be applied to the LCD having a common storage, however, the present invention can be applied to the LCD having a gate storage. In the above embodiments, a structure of liquid crystal making up the LCD is not described, however, the present invention can be applied not only to the LCD using a transverse electric field-type liquid crystal employed in the conventional LCD but also to the LCD using a TN (Twisted Nematic)—type liquid crystal, STN (Super Twisted Nematic)—type liquid crystal, or a like.

In addition, in the above embodiments, examples are shown in which the present invention is applied to an active-matrix LCD using the TFT as the switching element, however, the present invention can be applied also to a simple-matrix LCD. When the present invention is applied to the active-matrix LCD, as the switching element, not only the TFT but also a MIM (Metal Insulator Metal) diode, varistor, ring diode, MOSFET, or a like can be employed.

Moreover, in the above embodiments, whether the LCD is of a monochrome-type or of a color-type is not described and though the color degradation and the horizontal stroke are problems associated with the color LCD, however, the luminance irregularity is also a problem associated not only with the color LCD but also with a monochrome LCD. Therefore, the present invention can be applied to both the monochrome and color LCD. When the present invention is applied to the color LCD, a color filter used may be of various types. That is, the color filter may be of a stripe-type, of a delta-type in which color filters for red, green, and blue colors each corresponding to each of liquid crystal cells are arranged in a manner that a position of each of the color filters is deviated by a half of a pitch from a next scanning line and a dot pixel portion making up one pixel is arranged in a triangular form, of a mosaic-type in which the color filters for the red, green, and blue colors each corresponding to each of the liquid crystal cell are arranged in a repeated manner by every three color filters in a scanning direction and in a manner that the position of each of the color filter is deviated by one or two pitches from a next scanning line or of a four pixel arrangement-type in which three color filters for the red, green, and blue colors each corresponding to each of the liquid crystal cell and any one of the color filters are arranged in a quadrangular form.

Moreover, the present invention can be applied not only to the normally black-type LCD in which, in a state of no voltage applied, transmittance of light through the liquid crystal is low, but also to a normally white-type LCD in which, even in a state of no voltage, transmittance of light through the liquid crystal is high.

Furthermore, the LCD of the present invention may be used for the image display device using the LCD as a monitor of personal computers or a like.

It is apparent that the present invention is not limited to the above embodiments but may be changed and modified without departing from the scope and spirit of the invention.

What is claimed is:

1. A liquid crystal display comprising:
   a liquid crystal cell disposed at each point of intersections of a plurality of scanning lines, extending in a row direction, mounted at specified intervals in a display area being approximately quadrangular in shape placed at a predetermined position on a glass substrate being approximately quadrangular in shape and of a plurality of signal lines, extending in a column direction, mounted at specified intervals and containing a common electrode;
   signal terminals mounted at either or both of upper end portions or lower end portions of said glass substrate at a specified pitch, to which end portions of said signal lines routed to either or both of an upper portion on an upper side or of a lower portion on a lower side of said display area and divided into two or more blocks and gathered are connected;
   scanning terminals mounted at either or both of left end portions or right end portions of said glass substrate at a specified pitch, to which end portions of said scanning lines routed to either or both of a left portion on a left side or of a right portion on a right side of said display area and divided into two or more blocks and gathered are connected;
   common signal lines each being mounted in each row and each column in said display area used to apply a common voltage to said common electrode;
   common wirings each being mounted at either or both of an upper portion on an upper side or of a lower portion on a lower side of said display area and mounted at either or both of a left portion on a left side or of a right portion on a right side of said display area, to which each of end portions of a plurality of said common signal lines is connected;
   a first routing section made up of a metal film having very low transmittance of light emitted from a backlight and formed in a manner that a gap between blocks being adjacent to each other along one side of said display area is almost filled in, and wherein one portion facing said display area of which is connected to said common wiring;
   a second routing section made up of said metal film and formed in a manner that a region surrounded by an outer side portion of each of said blocks and by straight lines being four side lines of said display area being extended toward an end portion of said glass substrate is almost filled in, and wherein one portion facing said display area of which is connected to said common wiring; and
   a plurality of common terminals mounted so as to be adjacent to said signal terminal or said scanning terminal connected to an end portion of each of said signal lines or said scanning lines making up an outermost portion of each of said blocks and formed on said first routing section and said second routing section at an end portion of said glass substrate.

2. The liquid crystal display according to claim 1, wherein said first routing section and said second routing section formed at either or both of said left portion on said left side or of said right portion on said right side of said display area are formed on a same layer as a plurality of said scanning lines is formed and connected to said common wiring through a contact hole and wherein said first section and said second section formed at either or both of said upper portion on said upper side or of said lower portion on said lower side of said display area are formed on a same layer as a plurality of said signal lines is formed and connected to said common wiring through said contact hole.

3. The liquid crystal display according to claim 1, wherein each of said common wirings is made up of a longitudinal line and a horizontal line contacting sides of said display area and wherein said longitudinal line is formed on a same layer as a plurality of said signal lines is formed and said horizontal line is formed on a same layer as a plurality of said scanning lines is formed and said common wirings are connected to each other at a region where said longitudinal line and horizontal line are overlapped through contact holes and wherein each of said common signal lines is formed on a same layer as each of a plurality of said scanning lines is formed and connected to said longitudinal line through contact holes.

4. The liquid crystal display according to claim 1, wherein said first routing section and said second routing section are formed in a manner that each of said routing sections is placed far, by an interval being equal to a predetermined pitch, from said scanning lines or said signal lines being positioned at outermost portions of blocks adjacent to each other.

5. A liquid crystal display comprising:
   a liquid crystal cell disposed at each point of intersections of a plurality of scanning lines, extending in a row direction, mounted at specified intervals in a display area being approximately quadrangular in shape placed at a predetermined position on a glass substrate being approximately quadrangular in shape and of a plurality of signal lines, extending in a column direction, mounted at specified intervals, and containing a common electrode;
   signal terminals mounted at either or both of upper end portions or lower end portions of said glass substrate at a specified pitch, to which end portions of said signal lines routed to either or both of an upper portion on an upper side or of a lower portion on a lower side of said display area and divided into two or more blocks and gathered are connected;
   scanning terminals mounted at either or both of left end portions or right end portions of said glass substrate at a specified pitch, to which ends of said scanning lines routed to either or both of a left portion on a left side or of a right portion on a right side of said display area and divided into two or more blocks and gathered are connected;
   common signal lines each being mounted in each row and each column in said display area used to apply a common voltage to said common electrode;
   common wirings each being mounted at either or both of an upper portion on an upper side or of a lower portion on a lower side of said display area and mounted at either or both of a left portion on a left side or of a right portion on a right side of said display, to which each of end portions of a plurality of said common signal lines is connected;

a first routing section made up of a metal film having very low transmittance of light emitted from a backlight and formed in a manner that a gap between blocks, being adjacent to each other, formed in a manner so as to surround said display area, is almost filled in, and wherein one portion facing said display area of which is connected to said common wiring;

a second routing section made up of said metal film and formed in a manner that a region surrounded by an outer side portion of each of said blocks and by a straight line being one side being orthogonal to one side of said display area along which said block contacts, being extended toward an end portion of said glass substrate, is almost filled in, and wherein one portion facing said display area of which is connected to said common wiring; and a plurality of common terminals mounted so as to be adjacent to said signal terminal or said scanning terminal connected to an end portion of said signal line or said scanning line making up an outermost portion of each of said blocks and formed on said first and second routing sections at an end portion of said glass substrate.

6. The liquid crystal display according to claim 5, wherein said first routing section facing a corner portion of said display area is made up of a first approximate trapezoidal portion formed on a same layer as a plurality of said scanning lines is formed and of a second approximate trapezoidal portion formed on a same layer as a plurality of said signal lines is formed, wherein said first approximate trapezoidal portion is formed in a manner that it reaches a place being positioned opposite to said scanning line disposed at an outermost portion of said adjacent blocks where a straight line connecting an end of each of said signal terminals mounted at said specified pitch and an end of each of said scanning terminals on a side of said display area is extended and where said common wiring is extended, wherein said second approximate trapezoidal portion is formed in a manner that it reaches a place being positioned opposite to said signal line disposed at an outermost portion of said adjacent blocks where a straight line connecting an end of each of said signal terminals mounted at said specified pitch and an end of each of said scanning terminals on a side of said display area is extended and where said common wiring is extended, and wherein said first approximate trapezoidal and said second approximate trapezoidal portion are connected to each other at a portion where they are overlapped through contact holes with specified numbers and at a specified pitch.

7. The liquid crystal display according to claim 5, wherein each of said common wirings is made up of a longitudinal line and a horizontal line contacting sides of said display area and wherein said longitudinal line is formed on a same layer as a plurality of said signal lines is formed and said horizontal line is formed on a same layer as a plurality of said scanning lines is formed and said common wirings are connected to each other at a region where said longitudinal line and horizontal line are overlapped through contact holes and wherein each of said common signal lines is formed on a same layer as each of a plurality of said scanning lines is formed and connected to said longitudinal line through contact holes.

8. The liquid crystal display according to claim 5, wherein said first routing section and said second routing section are formed in a manner that each of said routing sections is placed far, by an interval being equal to a predetermined pitch, from said scanning lines or said signal lines being positioned at outermost portions of blocks adjacent to each other.

9. An image display device provided with a liquid crystal display comprising:

a liquid crystal cell disposed at each point of intersections of a plurality of scanning lines, extending in a row direction, mounted at specified intervals in a display area being approximately quadrangular in shape placed at a predetermined position on a glass substrate being approximately quadrangular in shape and of a plurality of signal lines, extending in a column direction, mounted at specified intervals and containing a common electrode;

signal terminals mounted at either or both of upper end portions or lower end portions of said glass substrate at a specified pitch, to which end portions of said signal lines routed to either or both of an upper portion on an upper side or of a lower portion on a lower side of said display area and divided into two or more blocks and gathered are connected;

scanning terminals mounted at either or both of left end portions or right end portions of said glass substrate at a specified pitch, to which end portions of said scanning lines routed to either or both of a left portion on a left side or of a right portion on a right side of said display area and divided into two or more blocks and gathered are connected;

common signal lines each being mounted in each row and each column in said display area used to apply a common voltage to said common electrode;

common wirings each being mounted at either or both of an upper portion on an upper side or of a lower portion on a lower side of said display area and mounted at either or both of a left portion on a left side or of a right portion on a right side of said display area, to which each of end portions of a plurality of said common signal lines is connected;

a first routing section made up of a metal film having very low transmittance of light emitted from a backlight and formed in a manner that a gap between blocks being adjacent to each other along one side of said display area is almost filled in, and wherein one portion facing said display area of which is connected to said common wiring;

a second routing section made up of said metal film and formed in a manner that a region surrounded by an outer side portion of each of said blocks and by straight lines being four side lines of said display area being extended toward an end portion of said glass substrate is almost filled in, and wherein one portion facing said display area of which is connected to said common wiring; and a plurality of common terminals mounted so as to be adjacent to said signal terminal or said scanning terminal connected to an end portion of each of said signal lines or said scanning lines making up an outermost portion of each of said blocks and formed on said first routing section and said second routing section at an end portion of said glass substrate.

10. An image display device provided with a liquid crystal display comprising a liquid crystal cell disposed at each point of intersections of a plurality of scanning lines, extending in a row direction, mounted at specified intervals in a display area being approximately quadrangular in shape placed at a predetermined position on a glass substrate being approximately quadrangular in shape and of a plurality of signal lines, extending in a column direction, mounted at specified intervals, and containing a common electrode;

signal terminals mounted at either or both of upper end portions or lower end portions of said glass substrate at a specified pitch, to which end portions of said signal lines routed to either or both of an upper portion on an upper side or of a lower portion on a lower side of said display area and divided into two or more blocks and gathered are connected;

scanning terminals mounted at either or both of left end portions or right end portions of said glass substrate at a specified pitch, to which ends of said scanning lines routed to either or both of a left portion on a left side or of a right portion on a right side of said display area and divided into two or more blocks and gathered are connected;

common signal lines each being mounted in each row and each column in said display area used to apply a common voltage to said common electrode;

common wirings each being mounted at either or both of an upper portion on an upper side or of a lower portion on a lower side of said display area and mounted at either or both of a left portion on a left side or of a right portion on a right side of said display, to which each of end portions of a plurality of said common signal lines is connected;

a first routing section made up of a metal film having very low transmittance of light emitted from a backlight and formed in a manner that a gap between blocks, being adjacent to each other, formed in a manner so as to surround said display area, is almost filled in, and wherein one portion facing said display area of which is connected to said common wiring;

a second routing section made up of said metal film and formed in a manner that a region surrounded by an outer side portion of each of said blocks and by a straight line being one side being orthogonal to one side of said display area along which said block contacts, being extended toward an end portion of said glass substrate, is almost filled in, and wherein one portion facing said display area of which is connected to said common wiring; and a plurality of common terminals mounted so as to be adjacent to said signal terminal or said scanning terminal connected to an end portion of said signal line or said scanning line making up an outermost portion of each of said blocks and formed on said first and second routing sections at an end portion of said glass substrate.

* * * * *